United States Patent [19]

Matsumoto

[11] Patent Number: 4,744,437
[45] Date of Patent: May 17, 1988

[54] POWER TRANSMITTING SYSTEM FOR A FOUR-WHEEL DRIVE VEHICLE

[75] Inventor: Rempei Matsumoto, Oota, Japan

[73] Assignee: Fuji Jukogyo Kabushiki Kaisha, Tokyo, Japan

[21] Appl. No.: 16,759

[22] Filed: Feb. 20, 1987

[30] Foreign Application Priority Data

| Feb. 27, 1986 | [JP] | Japan | 61-43095 |
| May 26, 1986 | [JP] | Japan | 61-120404 |
| Jul. 11, 1986 | [JP] | Japan | 61-163028 |
| Jul. 11, 1986 | [JP] | Japan | 61-163029 |

[51] Int. Cl.⁴ .................................................. B60K 17/34
[52] U.S. Cl. ................................................... 180/249
[58] Field of Search ....................... 180/249, 250, 248

[56] References Cited

U.S. PATENT DOCUMENTS

| 4,541,503 | 9/1985 | Akutagawa | 180/249 |
| 4,552,241 | 11/1985 | Suzuki | 180/249 |
| 4,566,554 | 1/1986 | Suzuki | 180/249 |

*Primary Examiner*—John A. Pekar
*Attorney, Agent, or Firm*—Martin A. Farber

[57] ABSTRACT

A planetary gear device is provided in a power transmitting system. One of the members of the planetary gear device is operatively connected to a front drive shaft and another member is operatively connected to a rear drive shaft. A clutch, the clutch torque of which is continuously changed, is operatively connected to the two members of the planetary gear device. The distribution of torque transmitted to the front and rear wheels is continuously changed by changing the clutch torque in accordance with driving conditions.

12 Claims, 5 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle.

In a conventional four-wheel drive vehicle having a central differential, which is called a full time four-wheel drive vehicle, the central differential operates to uniformly distribute the torque of an engine to the front wheels and to the rear wheels.

It is known that the distribution ratio of torque influences the driveability, steerability, stability, starting characteristic and other factors of operation. Namely, when the distribution to the front wheels is increased, a stable cornering characteristic at high vehicle speed is established, and when the distribution to the rear wheels is increased, steerability at low vehicle speed is improved. In the conventional four-wheel drive vehicle, the distribution ratio of the torque for the front wheels to the rear wheels can not be changed.

SUMMARY OF THE INVENTION

The object of the present invention is to provide a system which may change the distribution ratio of torque to front wheels and rear wheels in accordance with driving conditions of a four-wheel drive vehicle.

According to the present invention, there is provided a power transmitting system for a four-wheel drive vehicle comprising a planetary gear device for transmitting power of an engine to the front and rear wheels, a torque distribution device including clutch means provided for rendering the planetary gear device inoperative and for changing the torque transmitted to the front and rear wheels, and control means for rendering the clutch means operative.

In an aspect of the invention, the clutch means is a fluid operated multiple-disk type clutch, and the clutch is provided to lock two members of the planetary gear device with each other.

The other objects and features of this invention will become understood from the following description with reference to the accompanying drawings.

DETAILED DESCRIPTION OF THE PREFERRED EMBODIMENTS

Figure 1:
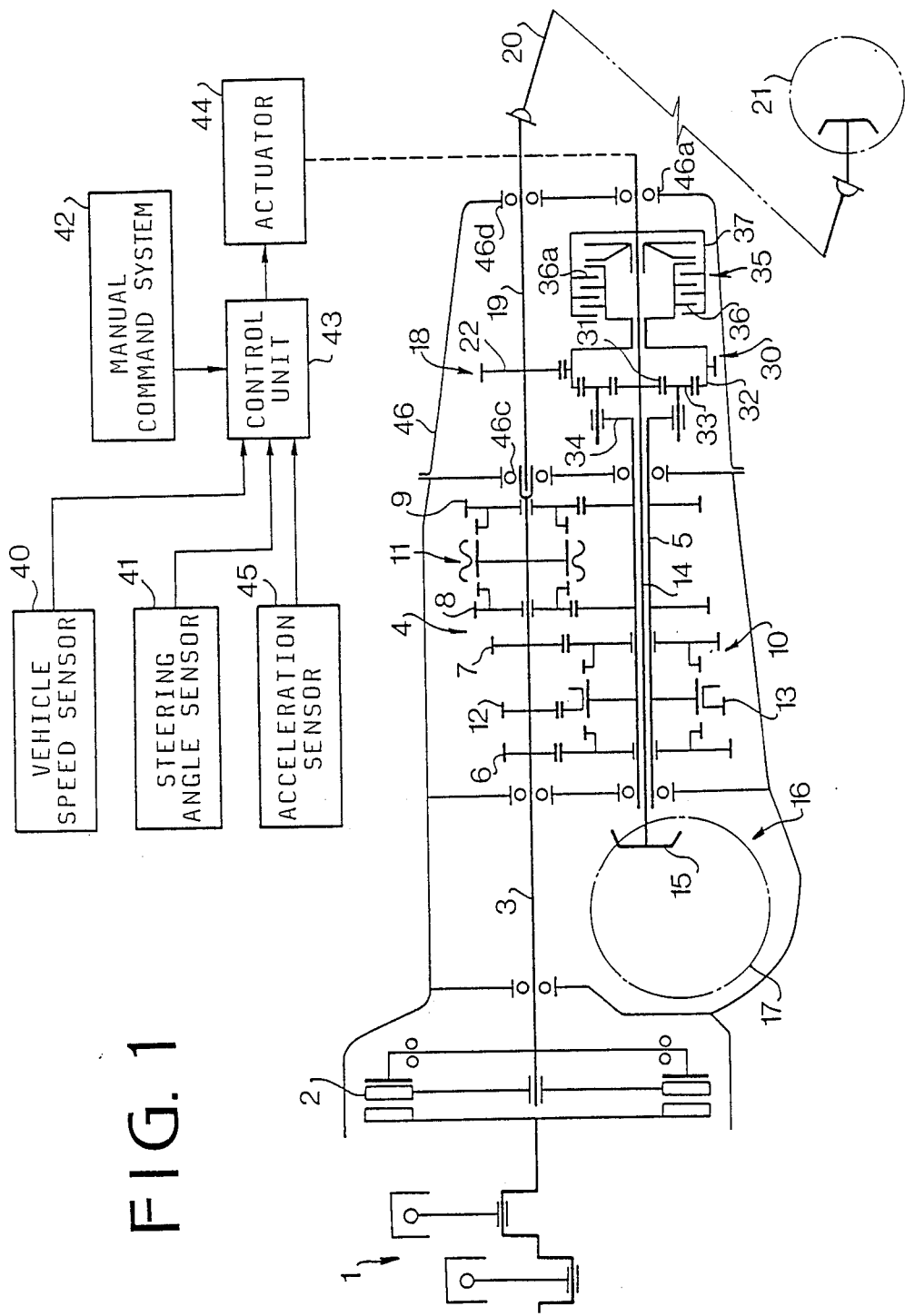
FIG. 1 is a schematic diagram of a four-wheel drive power transmission system in a first embodiment of the present invention.

FIG. 1 shows a power transmission system for a four-wheel drive motor vehicle to which the present invention is applied. An engine 1 is longitudinally mounted on the motor vehicle at a front portion thereof, thus forming a transaxle type. The power transmission system housed in a transmission case 46 comprises a clutch 2, transmission 4 and transfer device 18. The transmission 4 has an input shaft 3, a tubular output shaft 5 parallel with the input shaft 3, four pairs of change-speed gear 6 to 9 corresponding to first to fourth speed gears, and synchronizers 10 and 11. The synchronizers 10 and 11 are disposed between the gears 6 and 7 and between the gears 8 and 9, respectively. A reverse drive gear 12 mounted on the input shaft 3 meshes with a gear 13 formed on one side of a sleeve of the synchronizer 10 through an idler gear (not shown) for reverse drive.

A front drive shaft 14 is rotatably supported in the output shaft 5 and by a bearing 46a. A drive pinion 15 at the front end of the shaft 14 meshes with a crown gear 17 of a front differential 16 so as to transmit the power to front wheels of the vehicle.

In a transfer device 18 disposed behind the transmission, a rear drive shaft 19 is disposed in parallel with the front drive shaft 14. The rear drive shaft 19 is connected to rear wheels through a propeller shaft 20 and a rear differential 21. The shaft 19 is supported by bearings 46c and 46d.

The transfer device 18 has a planetary gear device 30 which serves as a central differential. The planetary gear device 30 comprises a sun gear 31, a ring gear 32 having internal and external teeth, planet pinions 33 in mesh with both gear 31 and the internal teeth of ring gear 32, and a carrier 34 supporting the pinions 33. The carrier 34 is connected with the output shaft 5. The sun gear 31 is coupled to the front drive shaft 14 and the external gear of the ring gear 32 is engaged with a gear 22 fixedly mounted on the rear drive shaft 19.

In order to control the distribution of torque to the front and rear wheels, or to lock the differential mechanism of the planetary gear device 30, a fluid operated multiple-disk friction clutch 35 is provided. The clutch 35 has inner disks 36 connected to the ring gear 32 and outer disks 36a secured to a drum 37 which is secured to the front drive shaft 14.

The system for controlling the torque distribution comprises a vehicle speed sensor 40, steering angle sensor 41, acceleration sensor 45 and manual command means 42, each electrically connected with a control unit 43. The manual command system 42 is actuated when the vehicle is driven on a rough road, for example a muddy road, or when the vehicle is stuck. An actuator 44 is provided to supply oil to the clutch 35. The control unit 43 selects an appropriate torque distribution ratio according to the driving conditions. The output signal of the control unit 43 is supplied to actuator 44 so as to control the oil pressure in the clutch 35.

The power of the engine 1 is transmitted to the transmission 4 through the clutch 2 and the input shaft 3 and further to the carrier 34 of the planetary gear device 30 in the transfer device 18. The torque is transmitted to the front wheels through sun gear 31, front drive shaft 14 and front differential 16, and to the rear wheels through ring gear 32, gear 22, rear drive shaft 19, propeller shaft 20 and rear differential 21. The difference between speed the of the front and rear wheels is absorbed as the planet pinions 33 walk around the sun gear 31 and on the ring gear 32. Thus, the planetary gear device 30 operates as a central differential. Accordingly, a full time four-wheel driving mode with the central differential function is established.

When the vehicle turns a corner at low or middle speed, the control unit 43 produces such an output signal that the oil pressure in the clutch 35 becomes zero. Therefore, the planetary gear device 30 becomes free. Since the torque is transmitted to the front and rear wheels through the sun gear 31 and the ring gear 32, respectively, the torque is distributed in accordance with the difference between the gear ratios of the sun gear 31 and the ring gear 32 (the diameter of the ring gear is larger than the sun gear). Therefore, the torque $T_F$ of the front wheels is smaller than the torque $T_R$ of the rear wheels ($T_F < T_R$) thereby improving cornering power of the vehicle.

When the vehicle is driven on a rough road, the control unit 43 produces a lock signal so that the oil pressure in the clutch 35 becomes maximum. Accordingly, the clutch 35 operates to couple the sun gear 31 with the ring gear 32. Therefore, the front and rear drive shafts are directly connected so that the torque $T_F$ substantially equals to the torque $T_R$ ($T_F \approx T_R$).

Figure 2:
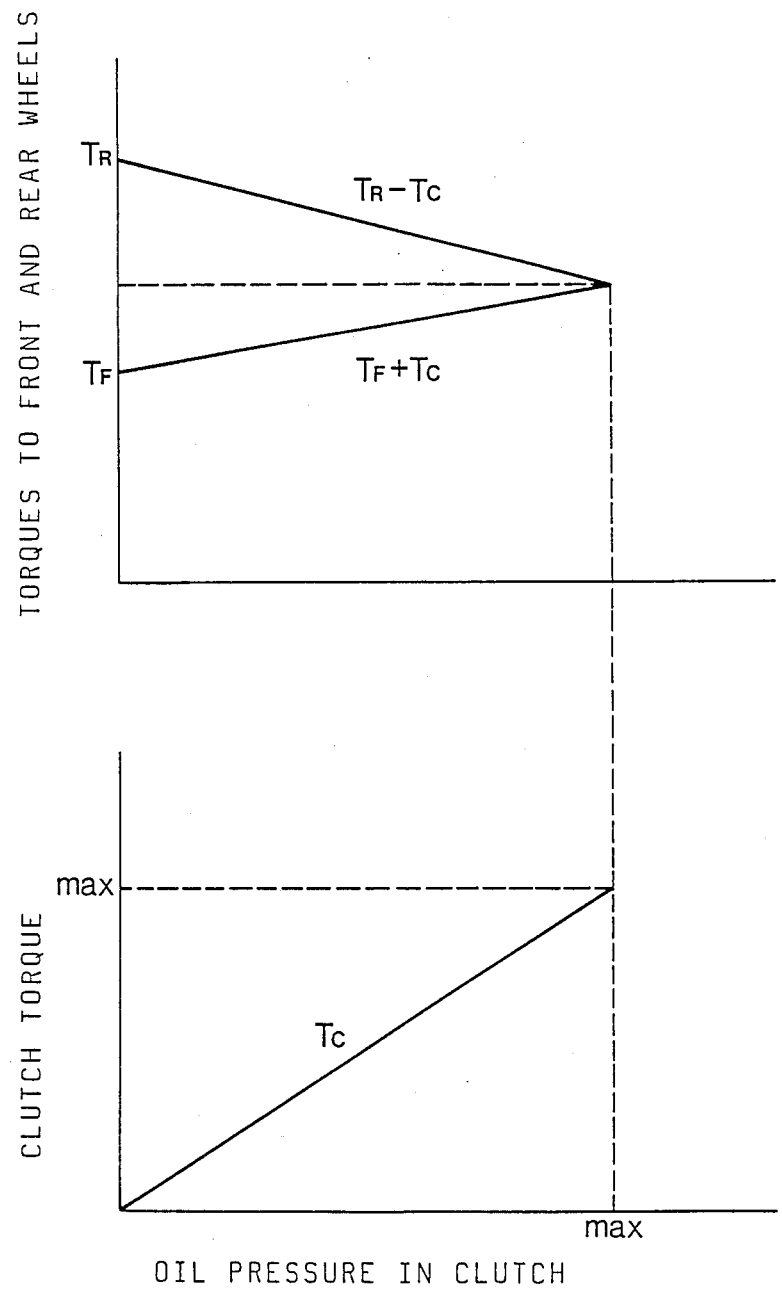
FIG. 2 is a graph showing relationships among oil pressure, clutch torque and front and rear wheel torque.

The oil pressure in the clutch 35 can be varied from zero to maximum. When the pressure is at a certain value, a clutch torque $T_C$ generates. Accordingly, the distribution ratio of the torque is $(T_F + T_C)$ divided by $(T_F - T_C)$. As shown in FIG. 2, as the oil pressure increases, the torque of the rear wheels becomes smaller and the torque of the front wheels larger. Thus, the torque distribution can be linearly varied.

Figure 3:
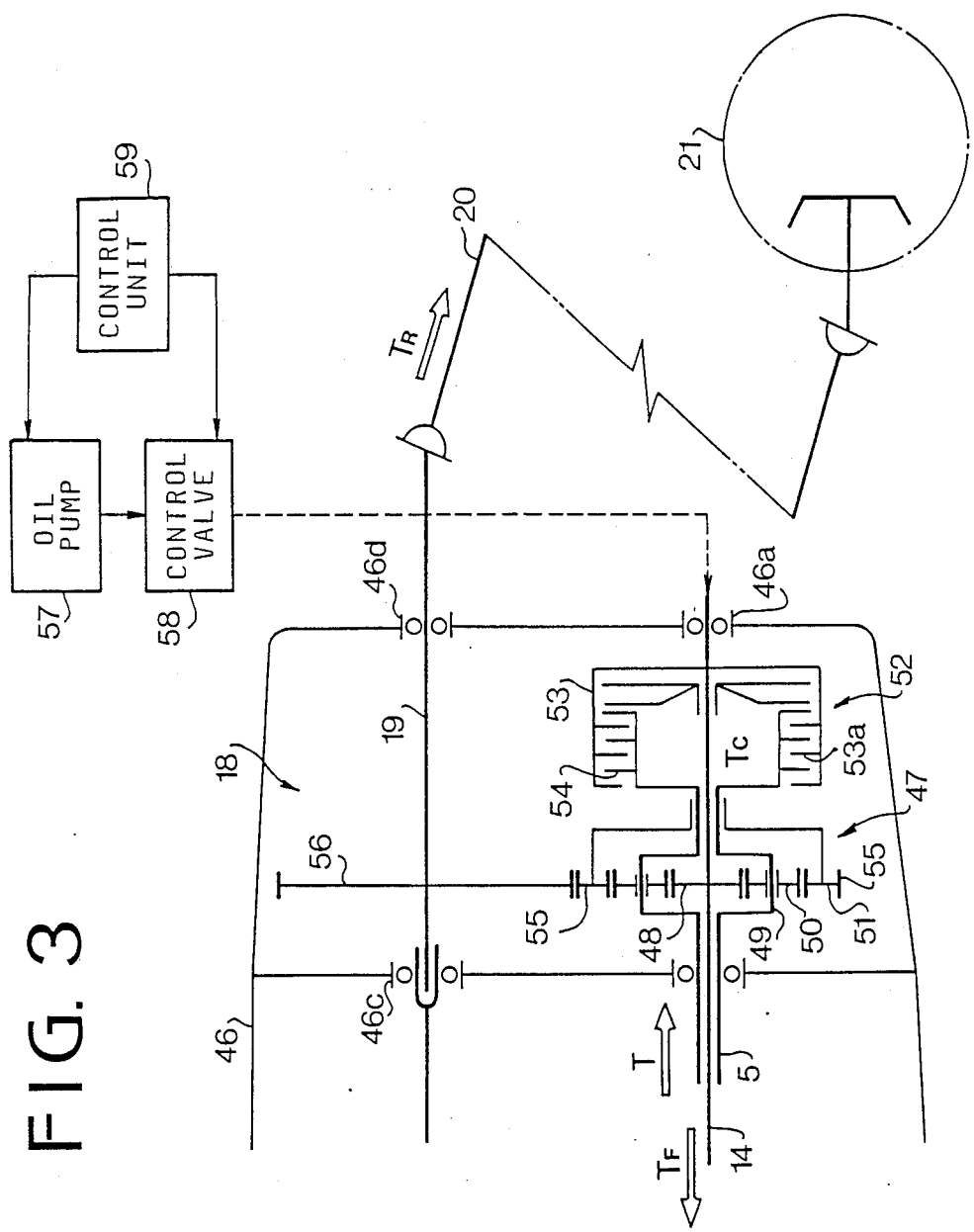
FIGS. 3 to 5 show schematic diagrams of transfer devices in second to fourth embodiments of the present invention, respectively.
Figure 4:
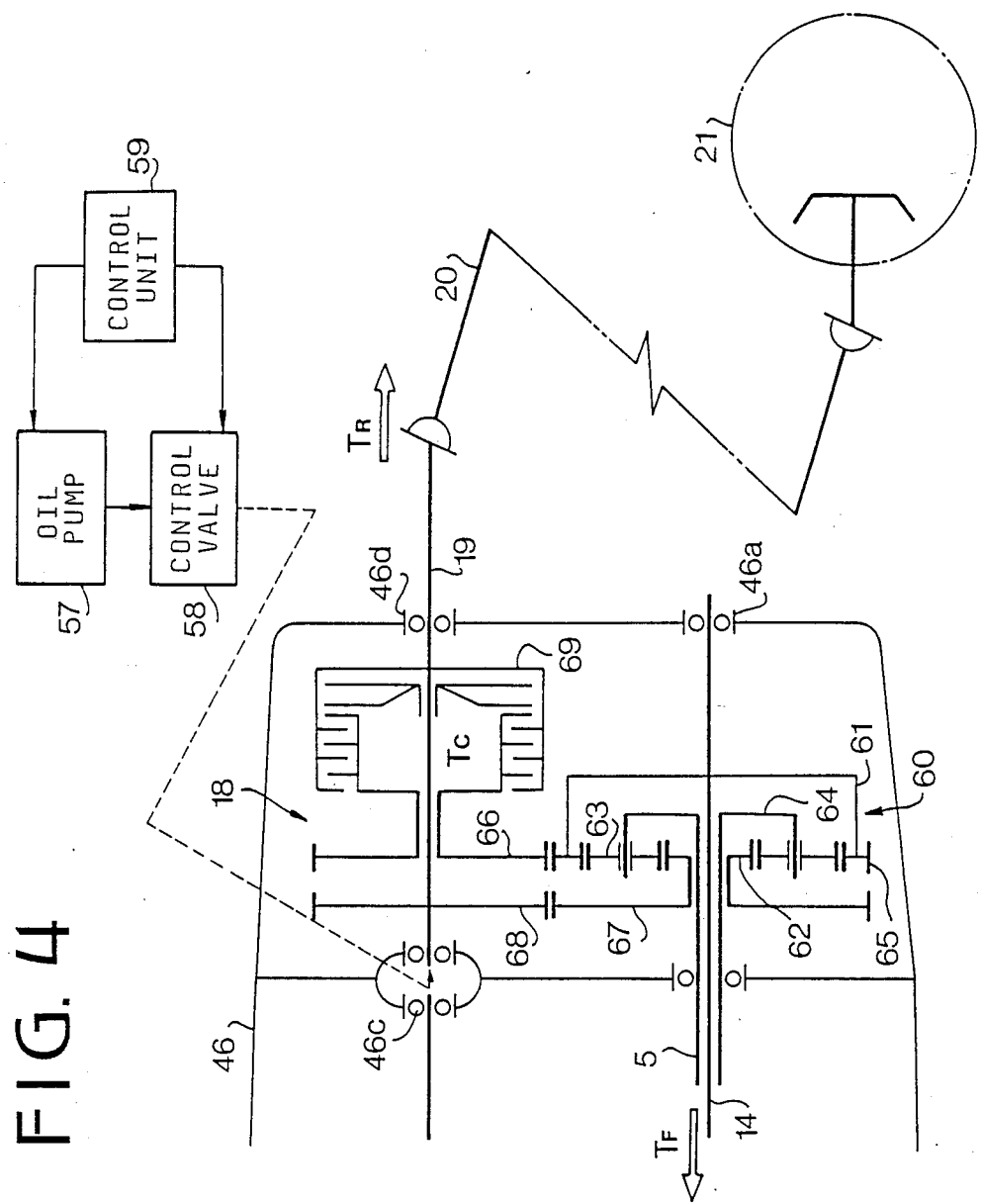
Figure 5:
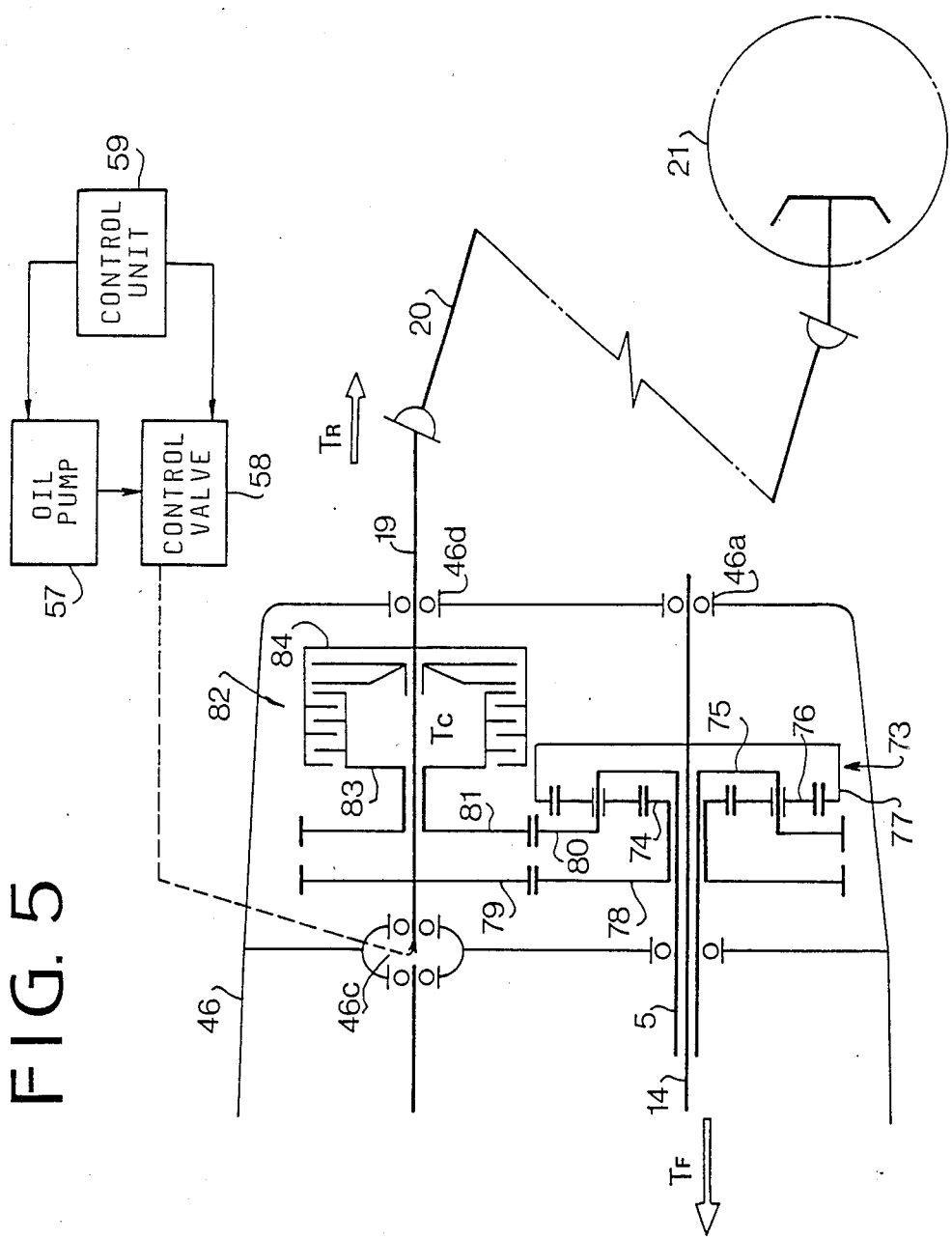

FIGS. 3 to 5 show other embodients of the present invention. The same numerals of reference indicate the same parts in the figures.

Referring to FIG. 3, the construction of the transmission system is the same as the first embodiment except for some modifications in the transfer device 18. The transfer device 18 has a planetary gear device 47 which functions as a central differential and a fluid operated multiple-disk friction clutch 52. The planetary gear device 47 comprises a sun gear 48 fixedly mounted on the front drive shaft 14, a ring gear 51, planet pinions 50 and a carrier 49 supporting the pinions 50. The carrier 49 is connected to the output shaft 5 of the transmission to be rotated therewith. The carrier 49 is further connected to inner disks 54 of the clutch 52. A drum 53 of the clutch 52 has outer disks 53a and is secured to the front drive shaft 14. The ring gear 51 has an external gear 55 which meshes with a gear 56 fixedly mounted on the rear drive shaft 19.

A control valve 58 is provided to control pressure of oil supplied by an oil pump 57 in accordance with a signal from a control unit 59 comprising a microcomputer.

When the control unit 59 produces a signal for closing the control valve 58, the pressure applied to the clutch 52 becomes zero to disengage the clutch 52. The torque T of the output shaft 5 from the transmission is transmitted to the front drive shaft 14 through the carrier 49, planet pinions 50 and sun gear 48. The torque is also transmitted to the rear drive shaft 19 through the carrier 49, planet pinions 50, ring gear 41 and gear 55. Since the diameter of the sun gear 47 is smaller than the ring gear 48, the rear torque $T_R$ is larger than the front torque $T_F$ ($T_F < T_R$). Thus, cornering power and the starting characteristic of the vehicle are improved.

On the other hand, when the control unit 59 produces a signal for opening the control valve 58, a maximum pressure is applied to the clutch 52. Accordingly, drum 53 and the disks 54 are fully engaged to lock the pinions 50 and the sun gear 48 together. Therefore, clutch torque $T_C$ is added to the front torque $T_F$ and subtracted from the rear torque $T_R$. Thus, the front torque $T_F$ and the rear torque $T_R$ are substantially equal ($T_F \approx T_R$).

When the valve 58 is progressively opened or closed, torque distribution can be varied.

In the third embodiment shown in FIG. 4, the front torque is adapted to be equal to or larger than the rear torque. A planetary gear device 60 of the transfer device 18 comprises a carrier 64 connected to the output shaft 5, planet pinions 63 supported by the carrier 64, a sun gear 62 and a ring gear 61 fixedly mounted on the front drive shaft 14. An external gear 65 on the outer periphery of the ring gear 61 meshes with a gear 66 having the same diameter as the gear 65. The sun gear 62 is connected with a gear 67 which is in mesh with a gear 68 fixedly mounted on the rear drive shaft 19. The diameters of the gears 67 and 68 are the same.

A fluid operated multiple-disk friction clutch 69 is provided to connect the gear 66 and the rear drive shaft 19.

The control unit 59 produces signals so as to drive the oil pump 57 and to actuate the solenoid operated control valve 58. The oil pressure is supplied to the clutch 69 through an oil passage formed in the rear drive shaft 19.

During a normal driving of the vehicle, the control unit 59 produces a signal for closing the solenoid operated valve 58. Therefore, torque T of the output shaft 5 is transmitted to the front drive shaft 14 through the carrier 64, planet pinions 63 and ring gear 61. The torque T is transmitted to the rear drive shaft 19 through sun gear 62 and gears 67, 68. Since the clutch 69 is disengaged, the gear 66 is idly rotated without transmitting the torque to the rear drive shaft 19. Accordingly, the distribution ratio between the front torque $T_F$ and the rear torque depends on the gear ratio between the large ring gear 61 and the small sun gear 62. Therefore, front torque $T_F$ is larger than the rear torque $T_R$ ($T_F > T_R$) thereby providing a stable driving of the vehicle.

When the vehicle is driven on rough roads, the control unit 59 applies a signal to the soleoid operated control valve 58 to open it. Therefore, a maximum oil pressure from the oil pump 57 is applied to the clutch 69. The torque T is transmitted to the front drive shaft in the aforementioned manner. As the gear 66 is connected to the rear drive shaft 19 by the engagement of the clutch 69, the torque T is transmitted to the rear drive shaft 19 through the ring gear 61, gears 65 and 66 and the clutch 69. Since gear 66 and the ring gear 61 have the same diameter, the torque transmitted to front and rear wheels are substantially the same ($T_F \approx T_R$).

FIG. 5 shows a transfer device of the fourth embodiment similar in respects to the third embodiment. The output shaft 5 of the transmission is connected to a carrier 75 of a planetary gear device 73. The planetary gear device 73 has a sun gear 74, planet pinions 76 and a ring gear 77 which is secured to the front drive shaft 14. The sun gear 74 is connected with a gear 78 which in turn meshes with a gear 79 securely mounted on the rear drive shaft 19. The carrier 75 is connected to a gear 80 having the same diameter as the gear 78. The gear 80 is in mesh with a gear 81 connected with disks 83 of a fluid operated multiple-disk friction clutch 82. A drum 84 of the clutch 82 is fixedly mounted on the rear drive shaft 19.

When the control unit 58 supplies a disengaging signal to the control valve 57, the oil pressure becomes zero. During such a state, the torque T of the output shaft 5 is transmitted to the front drive shaft 14 through the carrier 75, planet pinions 76 and the ring gear 77. On the other hand, the torque is transmitted to the rear drive shaft 19 through planet pinions 76, sun gear 74 and gears 78 and 79. In accordance with the gear ratio between the sun gear 74 and ring gear 77, the front torque $T_F$ is larger than the rear torque $T_R$ ($T_F > T_R$).

When the control circuit 56 renders the control valve 57 open, oil pressure is applied to the clutch 82. Therefore, clutch 82 is engaged thereby connecting the gear 81 to the rear drive shaft 19. Accordingly, the torque is additionally transmitted to the rear drive shaft 19 through the carrier 75, gears 80 and 81 and the clutch 82. Thus, clutch torque $T_C$ is added to the rear torque $T_R$ and subtracted from the front torque $T_F$. As the oil pressure P is increased to increase the clutch torque $T_C$, the front torque $T_F$ and the torque $T_R$ become substantially the same ($T_F > T_R$).

The fluid-operated multiple-disk friction clutch employed in the aforementioned embodiments may be replaced by other clutches, such as an electromagnetic clutch. The oil pump may be substituted with a pneumatic pump. The present invention may be applied to a motor vehicle having a laterally mounted engine.

In accordance with the present invention, there is provided a torque distribution system wherein the distribution ratio of the torque to the front and the rear wheels can be changed in accordance with the driving conditions or with the preference of the driver. Since a friction clutch is employed instead of a dog clutch, irregular or retarded operation is prevented. In addition, loss of torque is reduced.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive vehicle having an engine comprising
    a planetary gear device for transmitting power of the engine to front and rear wheels of the vehicle;
    a torque distribution device including clutch means, said clutch means for continuously changing clutch torque, said clutch means having opposite members operatively connected to two members of the planetary gear device; and
    control means for producing a control signal for operating the clutch means so as to change the clutch torque to various plurality of values in accordance with various driving conditions of the vehicle, so as to change distribution of torque transmitted to the front and rear wheels to a plurality of continuously varying torque distributions at the various driving conditions of the vehicle.

2. The system according to claim 1 wherein the clutch means is a fluid operated multiple-disk type clutch.

3. The system according to claim 2 wherein the clutch means is provided to lock the two members of the planetary gear device with each other from time to time.

4. The device according to claim 1, wherein
    said planetary gear device includes a plurality of exclusively parallel-axially and coaxially rotatable members comprising a sun gear operatively connected to one of said front and rear wheels and to one of said opposite members of said clutch means, a ring gear operatively connected to the other of said front and rear wheels and to the other of said opposite members of said clutch means, and a carrier having rotatably mounted thereto planet gears connected to said sun gear and said ring gear, said sun gear and said ring gear constituting said two members of said planetary gear device.

5. The device according to claim 4, wherein
said engine is operatively connected to said carrier.

6. The device according to claim 1, wherein
    said planetary gear device includes a plurality of exclusively parallel-axially and coaxially rotatable members comprising a sun gear and a ring gear, one of said gears being operatively connected to one of said front and rear wheels and to one of said opposite members of said clutch means,
    one of said two members of said planetary gear device is a carrier of said planetary gear device having rotatably mounted thereto planet gears connected to said sun gear and said ring gear, said carrier being operatively connected to the other of said opposite members of said clutch means, the other of said two members of said planetary gear device constituting said one of said sun gear and said ring gear, the other of said one of said sun gear and said ring gear being operatively connected to the other of said front and rear wheels.

7. The device according to claim 6, wherein
said engine is operatively connected to said carrier.

8. The device according to claim 1, wherein
said clutch means is a friction clutch.

9. The device according to claim 1, wherein
said clutch means and said planetary gear device are arranged such that the distribution of the torque to the front and rear wheels are linearly variable.

10. The device according to claim 1, wherein
one of said torque distributions is that the torque distribution to the front and rear wheels is substantially equal.

11. The device according to claim 1, wherein
one of said torque distributions is that the torque distribution to the front and rear wheels is unequal with the front wheels receiving a greater torque than the rear wheels.

12. The device according to claim 1, wherein
one of said torque distributions is that the torque distribution to the front and rear wheels is unequal with the rear wheels receiving a greater torque than the front wheels.

* * * * *